US005422484A

United States Patent [19]

Brogi et al.

[11] Patent Number: 5,422,484

[45] Date of Patent: Jun. 6, 1995

[54] INFRARED SENSOR SUITABLE FOR FIRE FIGHTING APPLICATIONS

[75] Inventors: Giulio Brogi; Luca Pietranera, both of Rome, Italy

[73] Assignee: Alenia Spazio SpA, L'Aguila, Italy

[21] Appl. No.: 752,582

[22] PCT Filed: Dec. 19, 1990

[86] PCT No.: PCT/EP90/02242

§ 371 Date: Oct. 21, 1991

§ 102(e) Date: Oct. 21, 1991

[87] PCT Pub. No.: WO91/09389

PCT Pub. Date: Jun. 27, 1991

[30] Foreign Application Priority Data

Dec. 20, 1989 [IT] Italy .................................. 48685/89

[51] Int. Cl.6 .......................... G08B 17/12; G01J 1/42

[52] U.S. Cl. ............................... 250/339.15; 250/342; 250/349; 250/353

[58] Field of Search .................. 250/332, 338.1, 338.5, 250/342, 349, 353, 339.01, 339.02, 339.15

[56] References Cited

U.S. PATENT DOCUMENTS

| | | | |
|---|---|---|---|
| 3,017,513 | 1/1962 | Messelt | 250/353 X |
| 3,402,290 | 9/1968 | Blackstone et al. | 250/338.1 X |
| 4,052,716 | 10/1977 | Mortensen | 340/578 X |
| 4,206,454 | 6/1980 | Schapira et al. | 340/578 |
| 4,322,124 | 3/1982 | Padgitt et al. | 250/338.1 X |
| 4,471,221 | 9/1984 | Middleton et al. | 250/339.15 |
| 4,481,417 | 11/1984 | Inglee | 250/338.1 |
| 4,556,796 | 12/1985 | Renals | 250/338.3 X |
| 4,694,172 | 9/1987 | Powell et al. | 250/342 X |
| 4,719,350 | 1/1988 | Alm | 250/332 |
| 5,055,683 | 10/1991 | McCracken | 250/349 X |

FOREIGN PATENT DOCUMENTS

| | | | |
|---|---|---|---|
| 1453784 | 8/1966 | France | 250/353 |
| 2555312 | 5/1985 | France | 250/349 |
| 1322708 | 7/1973 | Germany | 340/578 |
| 3140678 | 5/1982 | Germany | 340/578 |
| 61-38429 | 2/1986 | Japan | 340/578 |
| 996076 | 6/1965 | United Kingdom | 250/342 |

OTHER PUBLICATIONS

Thompson, "Practical Experience in the Detection of Hot Axle Boxes on Railway Trains", Conference on the Operation of Instruments in Adverse Environments, 1976, Inst. Phys. Conf. Ser. No. 34 ©1977.

Hirsch et al., "Airborne Infrared Line Scanners for Forest Fire Surveillance", Proceedings of the SPIE 14th Annual Technical Symposium: Photo-Optical Instrumentation Applications and Theory, San Francisco, Calif., Aug. 11-14, 1969, pp. 51-57.

*Primary Examiner*—Constantine Hannaher
*Assistant Examiner*—Edward J. Glick
*Attorney, Agent, or Firm*—Cohen, Pontani, Lieberman & Pavane

[57] ABSTRACT

An infrared detector particularly well suited for the detection of heat sources, specifically from fires in an outdoor environment. The infrared detector comprises an infrared sensor receiving infrared radiation from a focused refractive optical unit. The infrared radiation from the optical unit is appropriately filtered so as to optimize the reception of infrared radiation by the detector in a frequency band of within about 2.5 to 5 microns. The sensor is configured utilizing a linear matrix of individual infrared sensing elements which may be flexibly applied to modify the field of view of the sensor. The detector contains appropriate power and signal amplification circuitry so as to provide an electrical output signal corresponding to infrared radiation received in the desired frequency band. The entire detector may be housed in a hermetically sealed unit appropriate for outdoor use and mounted on a movable pedestal for inclusion in an overall fire protection system such as, for example, a forest fire detection and warning system.

7 Claims, 2 Drawing Sheets

INFRARED SENSOR SUITABLE FOR FIRE FIGHTING APPLICATIONS

FIELD OF THE INVENTION

The present invention relates to an infrared sensor capable of detecting heat sources at temperatures of 200° to 300° C. above an ambient background temperature, typically those heat sources coming from a fire, while rejecting solar radiation reflections and fluctuations in ambient background temperature.

BACKGROUND OF THE INVENTION

Currently known infrared sensors which are used to detect infrared radiation coming from fires operate in the 1 to 2.5 micron wavelength. Although such sensors are capable of detecting infrared radiation generated by a fire, they are subject to false alarm conditions due to the variation of reflected solar radiation reflected off the ground or off vegetation in the area of detection of the sensor. If, however, the sensitivity of the infrared sensor is extended beyond to the 4 or 5 micron wavelength, the ratio between the infrared radiation from the fire and infrared radiation coming from fluctuations of the ambient background temperature diminishes, making accurate detection of the fire less probable.

It would therefore be greatly advantageous to have an infrared fire detector which is optimized for detecting fires against an ambient background temperature with reduced succeptability to false alarms due to the variation of solar radiation from reflected sources.

OBJECTS AND SUMMARY OF THE INVENTION

The present invention is related to an infrared fire detector which is particularly well suited for the detection of heat sources in the natural environment, particularly from fires. It is generally intended for use in fire detection systems used to protect forests from forest fires. Other applications which are envisioned are those of hangar and air strip surveillance at airports as well as the monitoring of urban refuse depots, etc. Since the detector is particularly well suited for fire detection outdoors, it is envisioned that the sensor would find optimal use as a detection component in an integrated forest fire surveillance system.

The infrared detector of the present invention optimally detects heat sources in the infrared frequency band falling within about 2.5 to 5.0 microns. It is within this band that the infrared radiation due to wood fires is at its maximum, and therefore false fire alarms possibly triggered by solar reflections or thermal fluctuations of the ambient background temperature are minimized.

The detector is made up of an infrared sensor which receives infrared radiation which has been collected and focused by a refractive optical collection unit. Between the infrared sensor and the optical collection unit is a spectral filter have a pass band which is selected so as to optimize infrared detection of the system to a frequency band of between about 2.5 to 5 microns. The desired frequency band is obtainable through a suitable combination of materials which make up the optical collection unit, the spectral filter and the infrared response curve of the infrared sensor itself.

Suitable electronics are provided to provide bias current to the infrared sensor, if such sensor is, for example, of a photoconductive variety, and an amplifier is provided to amplify the signal coming from the infrared sensor to suitable levels for use in fire detection systems.

The infrared sensor used in the system may be implemented either as a photovoltaic or photoconductive sensor comprised of a single sensing element or it may be made up of a multiplicity of sensor elements arranged in a linear matrix. By arranging individual sensor elements in a linear matrix, the overall field of view of the sensor may be varied. For example, if each single detector element has a field of view of one degree, then to achieve a field of view of 15° to 20° the matrix would require 15 to 20 elements. Of course, the focal length of the optics would vary accordingly so as to insure correct collection and focusing of infrared radiation for the field of view selected.

The individual sensor elements may be photovoltaic or photoconductive sensors chosen from presently available materials such as InSb, InAs, PbSe and HgCdTe. By utilizing these materials, and given the amounts of radiation expected to strike the detector for the types of radiation be detected, the detector can be non-cooled. The material chosen for the individual elements of the infrared radiation sensor, due to the variations of bandwidth sensitivity among the materials, will require appropriate variation of the optics and of the pass band of the filter so as to maintain the overall detector sensitivity within the 2.5 to 5 micron wavelength band.

It is therefore an object of the invention to provide an infrared detector particularly well suited for the detection of fires in an outdoor environment. It is also an object of the invention to provide and infrared detector with a band width sensitivity within about 2.5 to 5 microns so as to optimize the detection of infrared radiation generated by wood fires while minimizing detection of variations due to solar radiation reflections or thermal fluctuations in the ambient background temperature within the field of view of the detector, thereby minimizing false alarms.

It is a further object of this invention to provide a non-cooled infrared detector which can be packaged in a hermetically sealed housing for flexible deployment in an outdoor environment.

Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

DETAILED DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
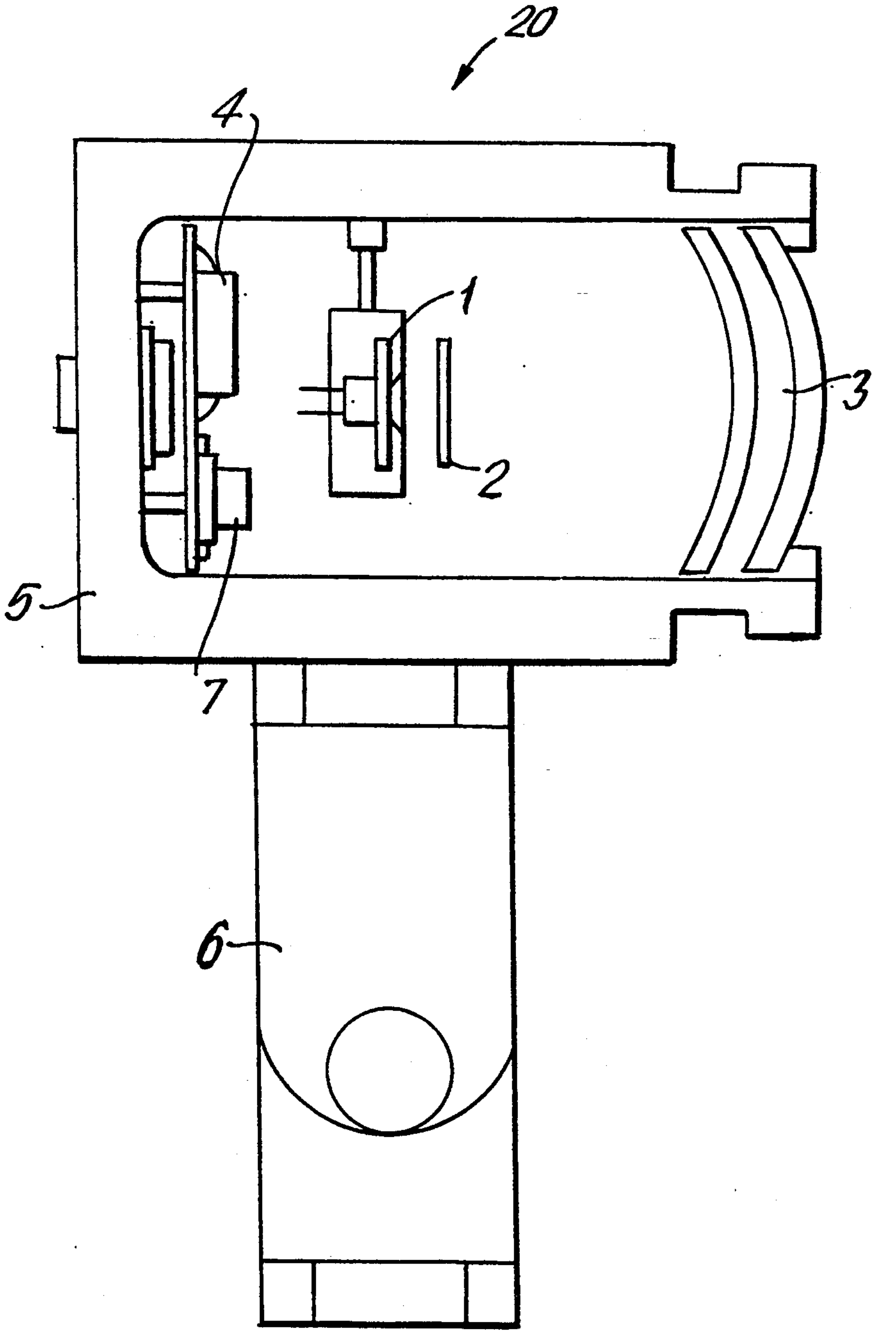
FIG. 1 is a side view of the infrared detector of the present invention showing the layout of the individual components.

With initial reference to FIG. 1, the infrared detector 20 is shown in side view. The individual components are housed in a hermetically sealed container 5 to which may be attached a suitably sized mounting bracket or pedestal 6.

Figure 2:
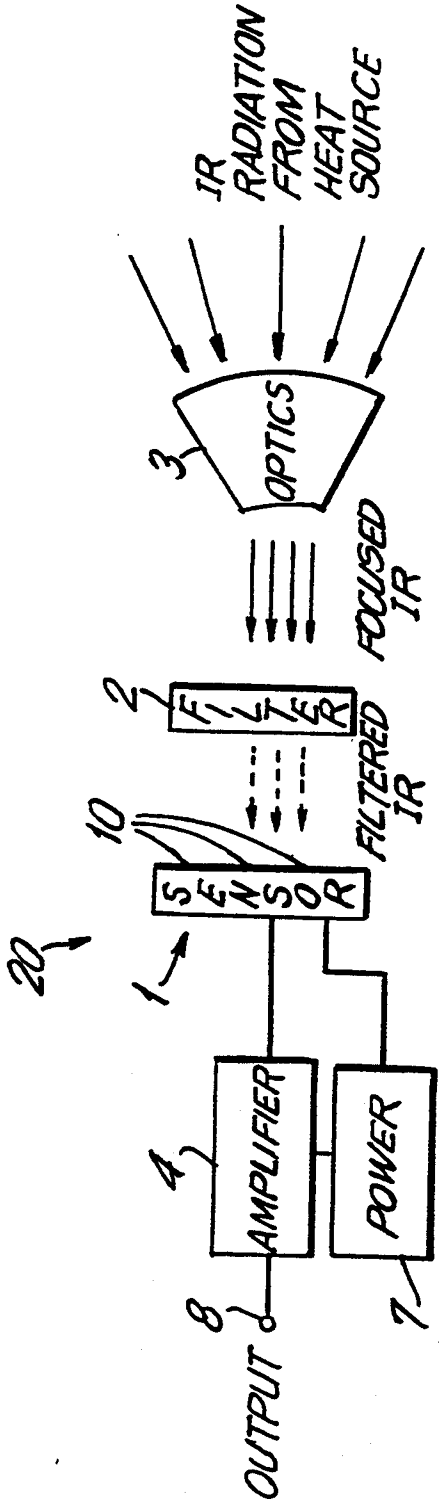
FIG. 2 is a block diagram showing the functional relationship of the components of the detector shown in FIG. 1.

In operation, as can be seen in greater detail in FIG. 2, infrared radiation from a heat source, typically a fire, strikes the detector 20 and is collected and focused by an optical collection unit 3, typically comprised of silicon crystal optics. The optical unit 3 focuses the radiation received from the heat source and passes the focused infrared radiation through filter 2, after which the filtered infrared radiation reaches infrared sensor 1. Filtered infrared radiation striking sensor 1 causes the generation of an electrical signal from sensor 1 to be fed to amplifier 4, wherein the signal is amplified and made available at an output 8.

The detector 20 is configured so as to optimize the detection of infrared radiation falling within a frequency range of about 2.5 to 5 microns in wavelength. It is within this frequency range that infrared radiation as a result a wood fire is maximally detected while infrared radiation usually resulting from reflected solar radiation or thermal fluctuations in the ambient background temperature are minimally detected. This increases the sensitivity of the detector for the particular detection mode desired while minimizing the possibility of false alarms.

The achievement of the desired infrared pass band results from the matching of the type of sensor material used for infrared sensor 1 and the pass band characteristics of filter 2, in combination with the optics 3. Optical collection unit 3 is comprised of reflective silicon crystal optics having a diameter on the order of 50 mm and a high relative aperture. The infrared sensor itself may be comprised of commonly available photovoltaic or photoconductive elements. Suitable materials currently available are InSb, InAs, PbSe and HgCdTe. Given the sensitivity requirements of the system and taking into account the amount of radiation anticipated to strike the detector, the sensor 1 may be non-cooled. Through the utilization of silicon crystal refractive optics in optics unit 3, filter 2 must be capable of filtering out wavelengths less than 2.5 microns. The cut-off at wavelengths greater than 4 or 5 microns may be obtained by utilizing a bandwidth limited sensor, such as one comprised of InAS, or adjusting the filter passband appropriately to filter out infrared radiation above these wavelengths. Such a situation may be encountered if the infrared sensor was comprised of PbSe, for example. In any case, the combined characteristics of optics 3, filter 2, sensor 1 must result in a detection sensitivity such that infrared radiation in the wavelength band of about 2.5 to 5 microns is maximized while wavelengths outside that band are minimized.

As required, a power unit 7 provides power for signal amplification unit 4 and, in the case where a photoconductive sensor is utilized, provides bias current to infrared sensor 1.

Figure 3:
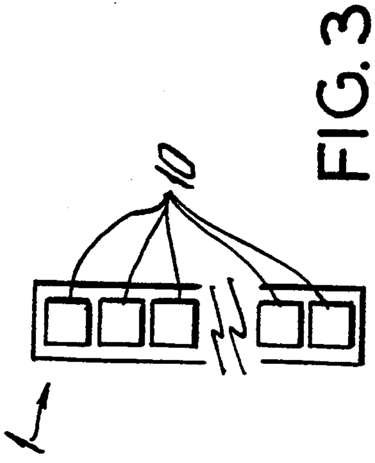
FIG. 3 is a detail of the infrared sensor showing the individual sensor elements.

The field of view of the sensor is adjustable to meet design requirements based upon the implementation of sensor 1. Sensor 1 is comprised of individual infrared sensor elements 10, as seen in FIG. 3. Each sensor element 10 has a particular field of view characteristic. Sensor elements 10 are configured in a linear matrix to achieve the required field of view by adjusting the number of sensor elements 10 utilized in the matrix of sensor 1. A typical field of view for the infrared sensor 1 when utilized in a forest fire detection system, for example, is for sensor 1 to have a field of view of approximately 15° to 20°. In such a system the sensor elements 10 would possess individual fields of view of 1° each, and therefore a linear matrix of approximately 15 to 20 elements is required to achieve the desired 15° to 20° overall field of view of sensor 1. Given the field of view of the matrix of sensor elements 10 within infrared sensor 1, the optics unit 3 must have a focal length which conforms to the desired field of view angle to provide focusing within the field of view desired.

As shown in FIG. 1, all of the elements may be housed in a hermetically sealed housing 5 and mounted as appropriate via a movable pedestal 6 for flexibility of application. When so configured, with a pass band sensitivity in the range of approximately 2.5 to 5 microns, in a field of view on the order of 15° to 20° the sensor can be utilized to detect heat sources at temperatures of 200° to 300° C. above an ambient background temperature. In standard weather conditions a detector so configured is able to detect a 6 meter fire at a 10 kilometer range. The detector therefore possess significant advantages when used as part of an overall fire detection system deployed outdoors, such as in a forest.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, however, therefore, to be limited only as indicated by the scope of the claims appended hereto.

We claim:

1. An infrared detector for the detection of infrared radiation emitted by fires comprising:

an optical collection unit (3) that collects and focuses electromagnetic radiation emitted within the field of view of said infrared detector, said optical collection unit (3) emitting focused electromagnetic radiation;

a spectral filter (2) that receives the focussed electromagnetic radiation emitted by said optical collection unit (3) and that blocks substantially all electromagnetic radiation having wavelengths shorter than about 2.5 microns and longer than about 5.0 microns, said spectral filter (2) emitting filtered electromagnetic radiation;

an infrared sensor (1) that receives the filtered electromagnetic radiation emitted by said spectral filter (2) and emits a sensor signal when infrared electromagnetic radiation is received, said infrared sensor (1) comprised of a plurality of infrared sensor elements (10), each of said plurality of infrared sensor elements (10) having an individual field of view and emitting a sensor element signal when infrared electromagnetic radiation between about 2.5 and 5.0 microns is sensed within said individual field of view, said sensor signal of said infrared sensor (1) being comprised of said sensor element signals emitted by said plurality of infrared sensor elements (10);

an amplifier (4) that receives and amplifies said sensor signal emitted by said infrared sensor (1), said amplifier (4) emitting an output signal in response to said sensor signal emitted by said infrared sensor (1); and a container (5) in which said optical collection unit (3), said spectral filter (2), said infrared sensor (1) and said amplifier (4) are mounted and hermetically sealed.

2. The infrared detector of claim 1, wherein said plurality of infrared sensor elements (10) are linearly aligned.

3. The infrared detector of claim 1, comprising 15 to 20 infrared sensor elements (10).

4. The infrared detector of claim 1, wherein said individual field of view of said infrared sensor elements (10) is about 1 degree.

5. The infrared detector of claim 4, comprising 15 to 20 infrared sensor elements (10).

6. The infrared detector of claim 1, wherein said optical collection unit (3) comprises refractive optics having a 50 millimeter diameter and a high relative aperture.

7. The infrared detector of claim 6, wherein said optical collection unit (3) comprises silicon crystal refractive optics.

* * * * *

UNITED STATES PATENT AND TRADEMARK OFFICE
CERTIFICATE OF CORRECTION

PATENT NO. : 5,422,484
DATED : June 6, 1995
INVENTOR(S) : Giulio BROGI, Luca PIETRANERA

It is certified that error appears in the above-identified patent and that said Letters Patent is hereby corrected as shown below:

On the ttile page, item:

[73] Assignee:

Selenia Industrie Elettroniche Associate S.p.A., Rome, Italy,

Signed and Sealed this

Fifth Day of November, 1996

Attest:

Bruce Lehman

BRUCE LEHMAN

*Attesting Officer* *Commissioner of Patents and Trademarks*